Oct. 19, 1948.　　　　D. R. HERRIOTT　　　　2,451,828
SAFETY DEVICE FOR FLUID BRAKES
Filed Jan. 6, 1947　　　　　　　　　　　　　　　2 Sheets-Sheet 1

DAVID R. HERRIOTT,
INVENTOR.

BY W. Beatty
ATTORNEY.

Oct. 19, 1948.
D. R. HERRIOTT
2,451,828
SAFETY DEVICE FOR FLUID BRAKES
Filed Jan. 6, 1947
2 Sheets-Sheet 2
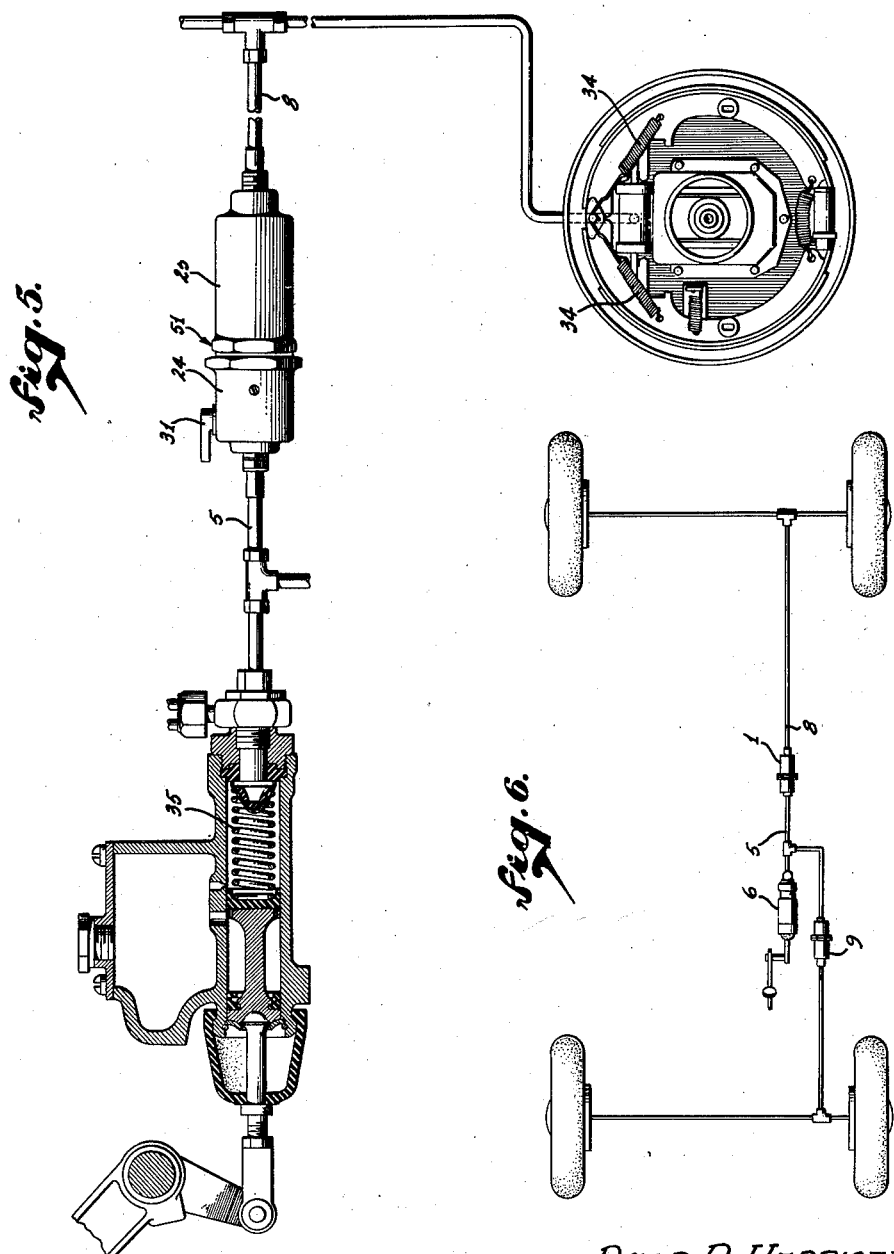
DAVID R. HERRIOTT,
INVENTOR.
BY
ATTORNEY.

Patented Oct. 19, 1948

2,451,828

UNITED STATES PATENT OFFICE 2,451,828

SAFETY DEVICE FOR FLUID BRAKES

David R. Herriott, Glendale, Calif.

Application January 6, 1947, Serial No. 720,353

5 Claims. (Cl. 303—84)

The invention relates to a safety device for the fluid brakes on an automobile or the like, and has for an object to prevent leakage in one of the brake lines or conduits from rendering all of the brakes inoperative.

The invention provides a safety device in the form of a piston to which the fluid pressure from the master cylinder is applied, and which in turn transmits that pressure to the fluid line leading to the brakes. A plurality of such safety devices are employed, for example one for the rear brakes, and another for the front brakes. If one of the brakes leaks, the piston acts as a valve to shut off the flow to that brake.

With such an arrangement, the piston will not be operative to apply the brakes when the brake pedal is pushed down unless the piston is maintained away from the brake port which it closes. A further object of the present invention is to provide means operating in conjunction with the fluid pressure to prevent the piston from drifting to a position closing the brake port.

A further object of the invention is to maintain the brake lines full of fluid to offset incipient leakage or evaporation, without, thereby, causing the piston to drift towards the brake port.

A still further object of the invention is to provide a by-pass and bleed arrangement permitting the brake line and the cylinder of the piston to be bled through the piston.

For further details of the invention, reference may be made to the drawing wherein Fig. 1 is a schematic view of the safety device of the present invention.

Figure 3:
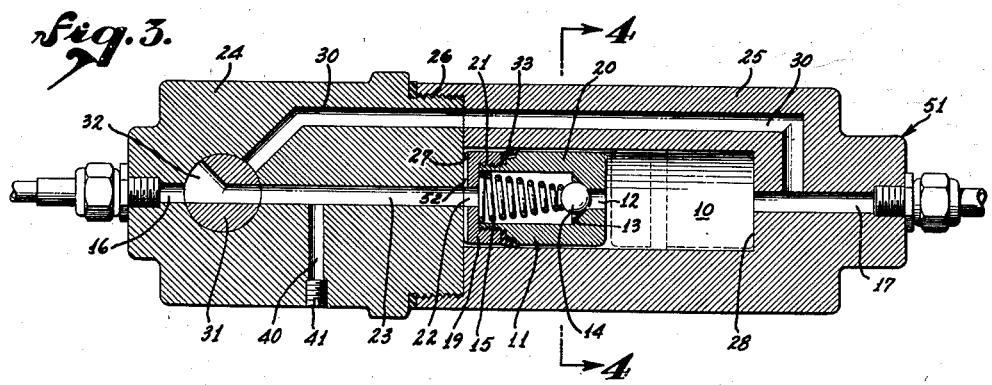
Fig. 3 is a sectional view on line 3—3 of Fig. 2.
Figure 4:
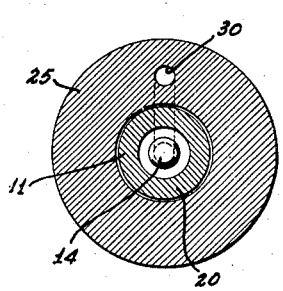
Fig. 4 is a sectional view on line 4—4 of Fig. 3.

The views in Figs. 3 and 4 are taken in the direction of the arrows.

Fig. 5 is a view in elevation, partly in section of a well-known brake system having the safety device of this invention.

Fig. 6 is a schematic view of the invention applied to a four-wheel brake system.

Figure 1:
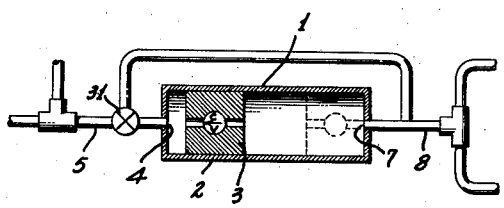
Figure 2:
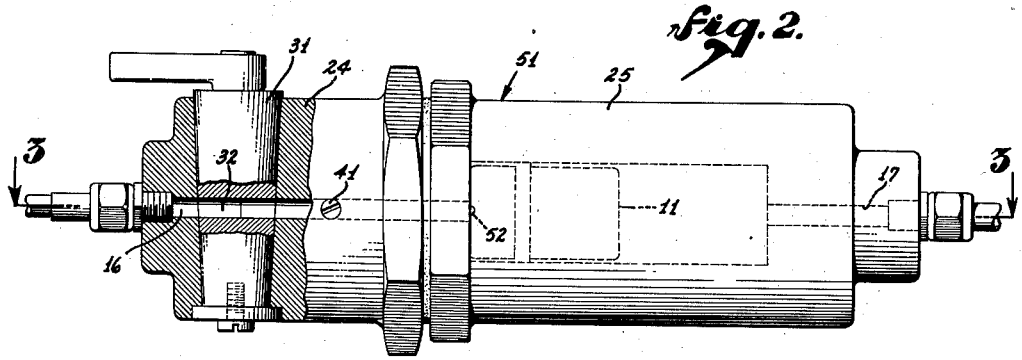
Fig. 2 is a full size view of the safety device in side elevation partly in section.

Referring in detail to the drawings in Fig. 1, the safety device 1 comprises a cylinder 2 having therein a sliding piston 3. The left end of cylinder 1 has a port 4 connected by pipe 5 to the master cylinder shown at 6 in Fig. 6. The other end of cylinder 1 has a port 7 connected by pipe 8 to the rear brakes. Further details of the unit 1 are shown in Figs. 2, 3, and 4, and a duplicate thereof indicated at 9 in Fig. 6 is connected between the master cylinder 6 and the front brakes.

If for example the rear brakes have a heavy leakage, such leakage is prevented from interfering with the operation of the front brakes, as fluid cannot flow through the piston 3 in a direction from the master cylinder to the rear brakes, as the piston 3 would seat at the right end of the cylinder 2 and close the port 7.

During normal operation of the brakes, it is important that the piston 3 should not drift to a position at the right end of cylinder 2 for the reason that if it were in that position at a time when the operator steps on the brake pedal, the piston 3 would not be able to apply to the fluid in the brake line the pressure at the master cylinder side of the piston. In order to prevent this, and to accomplish the other objects of the invention, the arrangement shown in Figs. 2 to 4 is provided, wherein the device 51 corresponds to devices 1 and 9 in Figs. 1 and 6. Device 51 has a cylinder 10 having a sliding piston 11 with a relief passage 12 therethrough. Passage 12 has a seat 13 for a ball valve 14 held to its seat by a spring 15. The valve 14 is a relief valve and it shuts off the flow when such flow is in a direction from the master cylinder port 16 towards the brake port 17, while permitting the flow under certain conditions, in the opposite direction.

Piston 11 has a valve chamber 18 larger than passage 12, to house valve 14 and spring 15. The right end of spring 15 bears on valve 14, and its left end bears against the head 19 of the piston and is secured to the body 20 of the piston by screw threads 21. The piston head 19 has an axial bore 22 which communicates with the axial passage 23 which communicates with the master cylinder port 16. The passage 23 is arranged in a casing head 24 connected to a casing body 25 by screw threads 26. The inner end 27 of the casing head 24 serves as an abutment for the piston head 19, the abutment at the other side of the piston comprising the end wall 28 of the cylinder 10. The wall 28 and the right end of piston body 20 can be milled and ground to closely fit together so as to make a fluid seal.

The casing parts 24 and 25 have a by-pass 30 around the piston 11, and this by-pass is controlled by a rotary valve 31 having on one side thereof an enlarged passage 32 permitting the valve to be rotated so that the port 16 will communicate with either by-pass 30 or the passage 23. In another position, valve 31 will shut off both the by-pass 30 and passage 23, for use when installing or repairing the device. During normal operation, the valve 31 is in the position shown, with by-pass 31 cut off and with port 16 communicating with the piston 11. Between valve 31 and piston 11, casing head 24 has a bleed passage 40 with a plug 41.

Between the piston head 19 and the piston body 20 is arranged a cup-shaped flexible washer 33 of neoprene, rubber or the like which flares out as shown, in a direction toward the brake port 17, whereby slight leakage is permitted around piston 11 in a direction from port 16 to port 17, to maintain the brake lines full at the right of port 17, without, thereby, causing the piston 11 to drift to the right. This insures an adequate supply of brake fluid at all times on the brake side of piston 11. Piston 11 may have a small clearance such as three mils. Hence, a very slight amount of leakage, due to evaporation or the like, and insufficient to prevent the brakes from operating, can be offset overcoming tendency of piston 11 to drift to the right. Such incipient leakage, however, is shut off in the event that a major leak should occur, for the reason that fluid cannot leak around washer 33 when piston 11 is seated on the end wall 28. Flow in the opposite direction is prevented by washer 33, as it acts as a hydraulic seal for flow from port 17 to 16 to ensure that piston 11 will travel to the left to the position shown in Fig. 3 where the brake pedal is released. If washer 33 should seal so tightly as to cause piston 11 to stick, or if it should become stuck due to extreme cold or for any other reason, the brakes will not drag because upon releasing the brake pedal and thereby reducing the pressure in the line between the master cylinder and port 16, the pressure in the brake line, being higher at that time, is relieved by pushing relief valve 14 off its seat to permit fluid to flow from the brakes to the master cylinder. However, this is an extreme condition which is unlikely to occur, as during normal operation, when the brake pedal is released, the piston 11, due to the higher pressure in the brake line, is urged to the position shown in Fig. 3, for two reasons, where it is operative to communicate the brake pedal pressure to the brakes. One of these reasons is that the pressure at which the spring 15 operates is intermediate the pressure at which the shoe return spring 34 (see Fig. 5) and the piston spring 35 in the master cylinder operate, bearing in mind that the pressure produced by spring 34 is greater than that produced by spring 35 to return the brake fluid to the master cylinder when the brake pedal is released. The other reason is that leakage to the right past washer 33 lubricates the piston and keeps the brake line full of fluid, ensuring its movement to the left. This leakage is facilitated, even though piston 11 is in its extreme position to the left, by groove 52 extending across the face of head 19 of piston 11.

The advantage of spring 15 being stronger than spring 35 is to cause the piston 11 to move fully to the left before relief valve 14 opens, ensuring that piston 11 will not drift, or be left in an intermediate position in the cylinder 10.

The advantage of having spring 15 weaker than the shoe return spring 34 is that if the fluid pressure between the brake and the piston 11 gets too high, causing the brake to drag, the pressure will be relieved by the relief valve 14.

In installing the device, the valve 31 is turned to connect port 16 to by-pass 30 and the brake line is bled as usual. Then after closing the brake bleeder valve not shown and opening the bleed passage 40 by removing plug 41, the brake pedal is depressed several times, causing piston 11 to move fully to the left or in normal operating position. With pressure in the passage 30 and the brake line at the right of piston 11, and with bleed passage 40 open, relief valve 14 permits bleeding through the piston 11. Upon closing passage 40 and turning valve 31 to normal operating position shown in Fig. 3, the brakes are in operating condition.

Various modifications may be made in the invention without departing from the spirit of the following claims.

I claim:

1. A safety device for a fluid brake, said device comprising a cylinder having a port at each of its opposite ends, a piston slidable in said cylinder and shutting off the flow through one of said ports when said piston is at that end of the cylinder, a unilateral fluid seal around said piston permitting leakage flow towards said one port, and preventing leakage flow in the opposite direction, a relief passage through said piston and a spring pressed relief valve therefor preventing flow through said passage towards said one port and permitting flow through said piston in the opposite direction, a by-pass around said piston, a valve for said by-pass, and a bleed passage between said by-pass valve and said piston.

2. A safety device for a fluid brake, said device comprising a cylinder having a port at each of its opposite ends, with a pressure supply first port and a brake side second port, a manually controlled by-pass passage around said cylinder connecting said first port with said second port, a manually operated rotary valve controlling said by-pass passage, a completely hydraulically operated piston slidable in said cylinder for shutting off the flow through said second port in a positive manner when serious leakage develops or to insure positive brake action where no serious leakage exists, a unilateral fluid seal around said piston permitting leakage flow towards said second port and preventing flow in the opposite direction thereby insuring positive return of said piston to static operating position, a relief passage through said piston and a spring pressed relief valve operating at a tension preventing flow in one direction in said relief passage and permitting flow in said relief passage in the opposite direction to relieve any excess fluid pressure in said brake side after said piston has been hydraulically urged by release movement of fluid to static operating position.

3. A safety device according to claim 2 comprising means providing a bleed passage between said rotary valve and said cylinder for bleeding air bubbles from the master cylinder side of said piston.

4. A safety device according to claim 2 comprising a bleed passage between said rotary valve and the master cylinder side of said piston, said rotary valve in one position connecting the master cylinder to one side of said piston and in another position disconnecting said one side of said piston from the master cylinder and connecting the latter to the other side of said piston.

5. A safety device according to claim 4, said rotary having a third position disconnecting said master cylinder from both sides of said piston.

DAVID R. HERRIOTT.

REFERENCES CITED

The following references are of record in the file of this patent:

UNITED STATES PATENTS

| Number | Name | Date |
| --- | --- | --- |
| 1,633,114 | Loose | June 21, 1927 |
| 1,905,077 | Walker | Apr. 25, 1933 |
| 2,024,042 | Jance | Dec. 10, 1935 |
| 2,095,560 | Vickers | Oct. 12, 1937 |